United States Patent
Dike et al.

(10) Patent No.: US 9,420,583 B2
(45) Date of Patent: Aug. 16, 2016

(54) COMBINED VOICE AND DATA COMMUNICATIONS IN A DISTRIBUTED HYBRID ALLOCATION AND RESERVATION MULTIPLE ACCESS MOBILE WIRELESS NETWORK

(71) Applicant: THE BOEING COMPANY, Chicago, IL (US)

(72) Inventors: Bruce A. Dike, Chicago, IL (US); Ceilidh Hoffman, Chicago, IL (US)

(73) Assignee: THE BOEING COMPANY, Chicago, IL (US)

(*) Notice: Subject to any disclaimer, the term of this patent is extended or adjusted under 35 U.S.C. 154(b) by 47 days.

(21) Appl. No.: 14/325,161

(22) Filed: Jul. 7, 2014

(65) Prior Publication Data

US 2016/0007345 A1  Jan. 7, 2016

(51) Int. Cl.
| | | |
|---|---|---|
| *H04L 1/00* | (2006.01) |
| *H04W 72/04* | (2009.01) |
| *H04W 72/10* | (2009.01) |
| *H04B 7/14* | (2006.01) |
| *H04W 28/26* | (2009.01) |
| *H04B 7/26* | (2006.01) |

(52) U.S. Cl.
CPC ............. *H04W 72/0446* (2013.01); *H04B 7/14* (2013.01); *H04W 28/26* (2013.01); *H04W 72/0406* (2013.01); *H04W 72/10* (2013.01); *H04B 7/2606* (2013.01)

(58) Field of Classification Search
CPC ............ H04W 72/0446; H04W 72/10; H04W 72/0406; H04W 28/26; H04B 7/14
See application file for complete search history.

(56) References Cited

U.S. PATENT DOCUMENTS

| | | | | |
|---|---|---|---|---|
| 5,448,568 A | * | 9/1995 | Delpuch | H04N 21/235 348/14.01 |
| 5,548,532 A | * | 8/1996 | Menand | H04N 7/52 348/384.1 |
| 5,757,788 A | * | 5/1998 | Tatsumi | H04J 3/22 370/336 |
| 6,212,221 B1 | * | 4/2001 | Wakayama | H04B 1/713 370/436 |
| 6,654,388 B1 | * | 11/2003 | Lexenberg | H04J 3/1623 370/352 |
| 7,103,371 B1 | | 9/2006 | Liu | |
| 2002/0093912 A1 | * | 7/2002 | Gummalla | H04J 3/0632 370/229 |

(Continued)

OTHER PUBLICATIONS

Bowman, et al., "Channel Access for Simultaneous Voice and Data Transmissions in a Multiple-Hop Packet Radio Network", Techno-Sciences, Inc., 07803-4506-1/98, IEEE, 1998, pp. 193-197.

(Continued)

*Primary Examiner* — Clemence Han
(74) *Attorney, Agent, or Firm* — Vista IP Law Group LLP; Cynthia A. Dixon (57) ABSTRACT

Systems, methods, and apparatus for communication utilizing a plurality of time slots over at least one channel are disclosed. In one or more embodiments, the disclosed method involves assigning, by at least one processor, at least one of the plurality of time slots for media data. In one or more embodiments, at least one of the plurality of time slots assigned for the media data is periodic. The method further involves assigning, by at least one processor, at least one of remaining time slots of the plurality of time slots for non-media data. In at least one embodiment, the assigning of at least one of the plurality of time slots for the media data has precedence over the assigning of the remaining time slots of the plurality of time slots for the non-media data.

16 Claims, 3 Drawing Sheets

(56) References Cited

U.S. PATENT DOCUMENTS

| | | | | |
|---|---|---|---|---|
| 2002/0167938 | A1* | 11/2002 | Wakayama | H04L 12/2856 370/352 |
| 2004/0246938 | A1* | 12/2004 | Schentrup | H04W 4/20 370/347 |
| 2010/0220693 | A1 | 9/2010 | Ho | |
| 2014/0281782 | A1* | 9/2014 | Tyrrell | H04L 1/18 714/748 |
| 2015/0009874 | A1* | 1/2015 | Edara | H04W 52/0225 370/311 |

OTHER PUBLICATIONS

Yum, et al., "Analysis of a Dynamic Reservation Protocol for Interactive Data Services on TDMA-Based Wireless Networks", IEEE Transactions on Communications, vol. 47, No. 12, Dec. 1999, pp. 1796-1801.

Chen, et al., "A Dynamic Channel Assignment Algorithm for Asymmetric Traffic in Voice/Data Integrated TDMA/TDD Mobile Radio", International Conference on Information, Communications and Signal Processing, ICICS '97, Singapore, Sep. 9-12, 1997, pp. 215-219.

Frigon, et al., "Data and Voice Integration in DR-TDMA for Wireless ATM Networks", Department of Electrical and Computer Engineering, University of British Columbia, 0-7803-5284-X, IEEE International Conference, Communications, ICC '99, vol. 3, 1999.

The Extended European Search Report dated Nov. 25, 2015 in European Application No. 15175461.1-1853. Applicant: The Boeing Company (7pages).

* cited by examiner

COMBINED VOICE AND DATA COMMUNICATIONS IN A DISTRIBUTED HYBRID ALLOCATION AND RESERVATION MULTIPLE ACCESS MOBILE WIRELESS NETWORK

FIELD

The present disclosure relates to voice (and/or video data) (e.g., media data) and data (e.g., non-media data) communications. In particular, it relates to combining voice and data communications in a distributed hybrid allocation and reservation multiple access (MA) mobile wireless network.

BACKGROUND

Mobile wireless network protocols which are designed to support high speed data transfer are typically unsuitable for voice communications (and/or video data) (e.g., media data) because transfer of large data messages (i.e., non-media data, e.g., internet protocol (IP) datagrams) is best accomplished with long continuous transmission bursts (e.g., 1500 bytes each), while voice must use frequent short transmission bursts (e.g., 128 bytes each). Combining these two fundamentally incompatible transmission characteristics into a single wireless protocol has been a major problem for mobile wireless networks. Current protocols either waste bandwidth or incur excessive protocol overhead costs to support voice. As a result, network designers have been forced to choose between a high speed data protocol or a high quality voice protocol. A common solution to date has been to implement two separate networks to accommodate both voice and data services.

Current mobile wireless protocols fall within three categories: 1.) high speed data transfer only, 2.) high quality voice with low data transfer rates, or 3.) highly inefficient combinations of voice and data, which consume excessive bandwidth. These existing solutions use transmission slot lengths that are either too long for efficient voice service or too short for efficient transfer of data, thereby resulting in inefficient utilization of available bandwidth for combined voice and data communications. As a result, most wireless protocols do not handle voice and data equitably, but instead favor one to the disadvantage of the other.

As such, there is a need for an improved method for combining voice and data communications.

SUMMARY

The present disclosure relates to a method, system, and apparatus for combining voice and data communications in a distributed hybrid allocation and reservation multiple access (MA) mobile wireless network. In one or more embodiments, a method for communication utilizing a plurality of time slots over at least one channel involves assigning, by at least one processor, at least one of the plurality of time slots for media data. In one or more embodiments, at least one of the plurality of time slots assigned for the media data is periodic. The method further involves assigning, by at least one processor, at least one of the remaining time slots (i.e. the non-assigned time slots) of the plurality of time slots for non-media data. In at least one embodiment, the assigning of at least one of the plurality of time slots for the media data has precedence over the assigning of the remaining time slots of the plurality of time slots for the non-media data.

In one or more embodiments, the media data comprises audio data and/or video data. In at least one embodiment, at least one processor is associated with a source node. In some embodiments, when the plurality of time slots are over at least two channels, the assigning of at least one of the plurality of time slots for the media data is staggered over at least two of the channels. In one or more embodiments, at least two of the remaining time slots of the plurality of time slots that are assigned to non-media data are concatenated together.

In at least one embodiment, the method further involves sending, from a source node, at least one control packet to a destination node and to at least one relay node. In some embodiments, at least one control packet is sent by a multicast, a broadcast, a link-state routing-based unicast, and/or a source routed path through the at least one relay node. In one or more embodiments, at least one control packet comprises a listing, for each relay node, of at least one of the time slots that are assigned for the media data and/or the non-media data to be supported by that relay node.

In one or more embodiments, the method further involves receiving, by at least one relay node, at least one control packet; and determining, by the relay node(s), whether the relay node(s) can support the time slot(s) in the listing for the relay node(s). The method further involves sending, by the relay node(s), to the source node a positive acknowledgement if the relay node(s) determined that it can support the time slot(s) in the listing for the relay node(s). Further, the method involves sending, by the relay node(s), to the source node a negative acknowledgement if the relay node(s) determined that it cannot support the time slot(s) in the listing for the relay node(s).

In at least one embodiment, the method further involves including, by the source node, the relay node(s) in a virtual circuit from the source node to the destination node, when the source node receives a positive acknowledgement from the relay node (s). In some embodiments, the method further involves excluding, by the source node, the relay node(s) from the virtual circuit, when the source node receives notification from the relay node(s) that the relay node(s) can no longer support the time slot(s) in the listing for the relay node(s). In at least one embodiment, the method further involves excluding, by the source node, the relay node(s) from the virtual circuit from the source node to the destination node, when the source node receives a negative acknowledgement from the relay node(s).

In one or more embodiments, a system for communication utilizing a plurality of time slots over at least one channel involves at least one processor to assign at least one of the plurality of time slots for media data, and to assign at least one of the remaining time slots (i.e. the non-assigned time slots) of the plurality of time slots for non-media data. In at least one embodiment, at least one of the plurality of time slots assigned for the media data is periodic. In some embodiments, the assigning of at least one of the plurality of time slots for the media data has precedence over the assigning of the remaining time slots of the plurality of time slots for the non-media data.

In at least one embodiment, when the plurality of time slots are over at least two channels, at least one processor assigns at least one of the plurality of time slots for the media data such that at least one of the plurality of time slots for the media data is staggered over at least two of the channels. In some embodiments, the system further involves a source node to send at least one control packet to a destination node and to at least one relay node. In one or more embodiments, the source node sends at least one control packet by a multicast, a broadcast, a link-state routing-based unicast, and/or a source routed path through the at least one relay node.

The features, functions, and advantages can be achieved independently in various embodiments of the present inventions or may be combined in yet other embodiments.

DRAWINGS

These and other features, aspects, and advantages of the present disclosure will become better understood with regard to the following description, appended claims, and accompanying drawings where:

DESCRIPTION

The methods and apparatus disclosed herein provide an operative system for combining voice (and/or video data and/or text messaging data and/or instant messaging data) (e.g., media data) and data (e.g., non-media data) communications in a distributed hybrid allocation and reservation multiple access (MA) mobile wireless network. The disclosed system allows for a mobile wireless network to efficiently provide both high quality voice (and/or video) and high speed data services simultaneously. The present disclosure permits a high quality voice (and/or video) connection to be opened and maintained by users, while at the same time high speed data streams are being transmitted on the network in a dynamically adaptive manner.

The present disclosure provides a wireless network protocol which employs multiple transmission slot lengths to accommodate both voice (and/or video) and data in a single transmission frame. Voice (and/or video) transmission slots are periodically inserted between data transmission bursts to simultaneously enable a high quality voice (and/or video) and efficient high speed data transfer in a dynamically adaptive manner. The disclosed solution allows for network designers to use the same mobile wireless protocol for voice (and/or video) and data transfer. As a result, radios which currently support voice (and/or video) and data will be able to transmit data at much higher rates. Radios which currently have separate channels for voice (and/or video) and data will now only require one channel and, thus, can be made smaller and lighter. Alternatively, users which formerly carried one radio for voice (and/or video) and another radio for data are now able to send and receive voice (and/or video) and data with a single radio with minimal sacrifice in performance.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with, and that the system described herein is merely one example embodiment of the invention.

For the sake of brevity, conventional techniques and components related to signal processing, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

Figure 1:
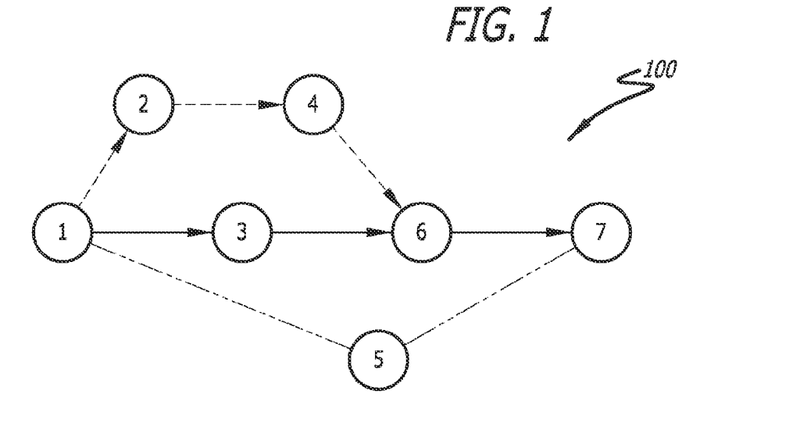
FIG. 1 is a schematic diagram showing the system for combining voice and data communications in a distributed hybrid allocation and reservation multiple access (MA) mobile wireless network, in accordance with at least one embodiment of the present disclosure.

FIG. 1 is a schematic diagram showing the system 100 for combining voice and data communications in a distributed hybrid allocation and reservation multiple access (MA) mobile wireless network, in accordance with at least one embodiment of the present disclosure. In this figure, a source node (node 1) and a destination node (node 7) are shown. In between the source node (node 1) and the destination node (node 7) lie five relay nodes (nodes 2, 3, 4, 5, and 6). At least some of the relay nodes (nodes 2, 3, 4, 5, and 6) are used in various combinations to route data (e.g., media data (e.g., audio and/or video data) and/or non-media data (e.g., IP datagrams)) from the source node (node 1) to the destination node (node 7).

For the transfer of data from the source node (node 1) to the destination node (7), the system 100 utilizes time division multiple access (TDMA) time slots. During operation of the system 100, at least one processor assigns at least one of the time slots for media data (e.g., types of data that require short bursts, such as audio, video, text messaging, and/or instant messaging data). In one or more embodiments, the time slots assigned for the media data are periodic. At least one processor also assigns at least one of the remaining time slots (i.e. at least one of the time slots that have not been assigned for media data) for non-media data (e.g., types of data that require a large amount of data to be transmitted, such as internet protocol (IP) datagrams). At least one processor gives the assigning of at least one of the time slots for media data precedence over the assigning of at least one of the remaining time slots for non-media data. In at least one embodiment, at least one processor is associated with the source node (node 1).

Figure 2:
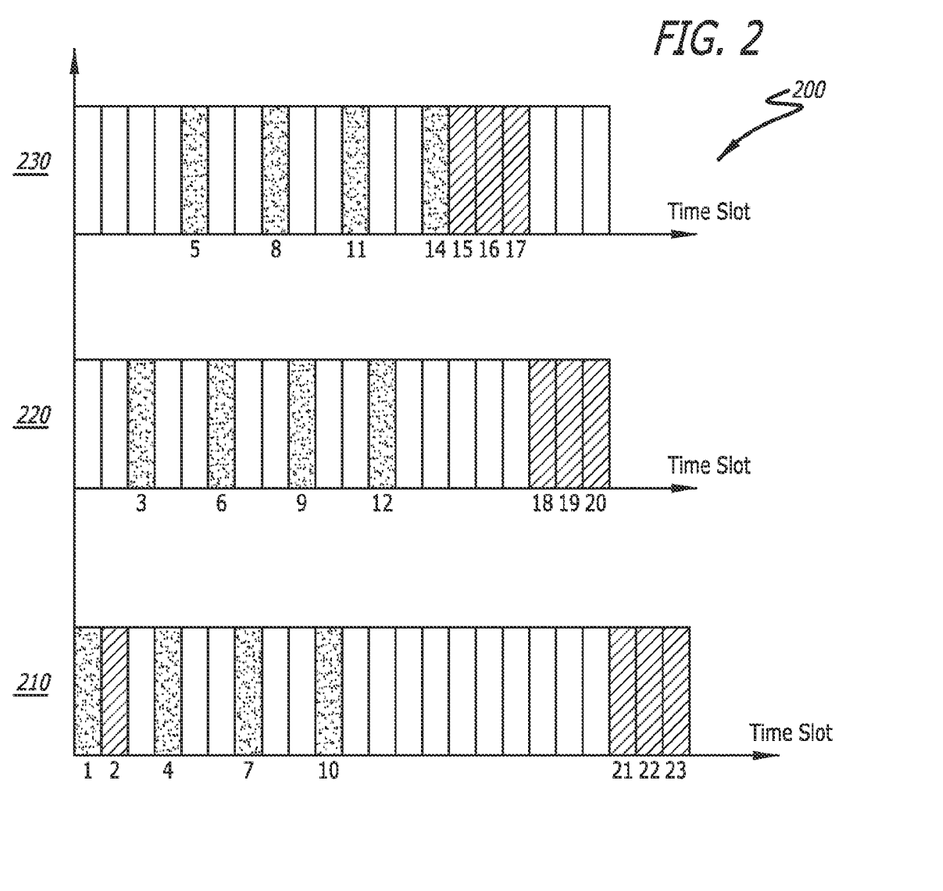
FIG. 2 is a diagram showing three graphs depicting exemplary assignments of time slots for media data (e.g., audio and/or video data) and non-media data (e.g., internet protocol (IP) datagrams), in accordance with at least one embodiment of the present disclosure.

It should be noted that an exemplary assignment of time slots for media data and non-media data is shown in FIG. 2. The description of FIG. 2 describes in detail the assignment process of the time slots.

Referring back to FIG. 1, after the time slots are assigned, the source node (node 1) sends a control packet to the destination node (node 7) via a path comprising some relay nodes. For this example, the source node (node 1) sends the control packet to the destination node (node 7) via relay nodes (nodes 3 and 6). The control packet may be sent from the source node (node 1) to the destination node (node 7) and the relay nodes (nodes 3 and 6) by various different means including, but not limited to, a multicast, a broadcast, a link-state routing-based unicast, and a source routed patch through the relay nodes (e.g., through relay nodes 3 and 6).

The control packet comprises a listing for each relay node (e.g., relay nodes 3 and 6) of the time slots that are assigned for media data and/or non-media data to be supported that that particular relay node. For example, the listing may specify that the first relay node in the path (e.g., relay node 3), from the source node (node 1) to the destination node (node 7), may need to support time slots 3, 6, 9, and 12 for media data and support time slots 18, 19, and 20 for non-media data. And, for example, the listing may specify that the second relay node in the path (e.g., relay node 6), from the source node (node 1) to the destination node (node 7), may need to support time slots 5, 8, 11, and 14 for media data and support time slots 15, 16, and 17 for non-media data.

After the relay nodes (e.g., nodes 3 and 6) receive the control packet, at least one processor associated with each of the relay nodes (e.g., nodes 3 and 6) determines whether that particular relay node can support the specific time slot assignments in the listing. For example, relay node 3 will determine whether or not it can support time slots 3, 6, 9, and 12 for media data and support time slots 18, 19, and 20 for non-media data. And, for example, relay node 6 will determine whether or not it can support time slots 5, 8, 11, and 14 for media data and support time slots 15, 16, and 17 for non-media data.

If the relay node(s) (e.g., relay node 3 and/or 6) determines that it can support the time slots specified for it in the listing, the relay node(s) will send a positive acknowledgement message back to the source node (node 1). However, if the relay node(s) (e.g., relay node 3 and/or 6) determines that it cannot support the time slots specified in the listing, the relay node(s) will send a negative acknowledgement message back to the source node (node 1).

When the source node (node 1) receives a positive acknowledgement message from a relay node(s) (e.g., node 3 and/or node 6), the source node (node 1) will include the relay node(s) (e.g., node 3 and/or node 6) in a virtual circuit that is constructed from the source node (node 1) to the destination node (node 7). Once the virtual circuit is constructed (e.g., a virtual circuit from the source node (node 1) to the destination node (node 7) via relay nodes (nodes 3 and 6)), the source node (node 1) will send the media data and/or the non-media data from itself to the destination node (node 7) via the relay nodes (e.g., nodes 3 and 6).

However, when the source node (node 1) receives a negative acknowledgement message from a relay node(s) (e.g., node 3 and/or node 6), the source node (node 1) will exclude the relay node(s) (e.g., node 3 and/or node 6) from a virtual circuit that is to be constructed from the source node (node 1) to the destination node (node 7).

It should be noted that after the virtual circuit is constructed (e.g., a virtual circuit from the source node (node 1) to the destination node (node 7) via relay nodes (nodes 3 and 6)), if the source node (node 1) later receives notification from a relay node (e.g., node 3) that the relay node (e.g., node 3) can no longer support the time slots specified for it in the listing, the source node (node 1) will exclude (or remove) the relay node (e.g., node 3) from the virtual circuit. When this happens, at least one processor associated with the source node (node 1) will revise (or amend) the control packet so that the listing for the time slots that can no longer be supported by that relay node (e.g., node 3) are to be supported by a different relay node(s) (e.g., nodes 2 and 4).

Then, the source node (node 1) will send the revised control packet to the relay nodes (e.g., nodes 2 and 4) and, optionally, to the destination node (node 7) and to relay node 6. The revised control packet may be sent from the source node (node 1) to the relay nodes (e.g., nodes 2 and 4) by various different means including, but not limited to, a multicast, a broadcast, a link-state routing-based unicast, and a source routed patch through the relay nodes (e.g., through relay nodes 2, 4, and 6).

After the relay nodes (e.g., nodes 2 and 4) receive the revised control packet, at least one processor associated with each of the relay nodes (e.g., nodes 2 and 4) determines whether that particular relay node can support the specific time slot assignments in the listing. If the relay node(s) (e.g., relay node 2 and/or 4) determines that it can support the time slots specified for it in the listing, the relay node(s) will send a positive acknowledgement message back to the source node (node 1). However, if the relay node(s) (e.g., relay node 2 and/or 4) determines that it cannot support the time slots specified in the listing, the relay node(s) will send a negative acknowledgement message back to the source node (node 1).

When the source node (node 1) receives a positive acknowledgement message from a relay node(s) (e.g., node 2 and/or node 4), the source node (node 1) will include the relay node(s) (e.g., node 2 and/or node 4) in a virtual circuit that is constructed from the source node (node 1) to the destination node (node 7). Once the virtual circuit is constructed (e.g., a virtual circuit from the source node (node 1) to the destination node (node 7) via relay nodes (nodes 2, 4, and 6)), the source node (node 1) will send the media data and/or the non-media data from itself to the destination node (node 7) via the relay nodes (e.g., nodes 2, 4, and 6).

It should be noted that once the virtual circuit is constructed, it will be maintained until the source (node 1) receives notification from at least one relay node that it can no longer support the specific time slot assignments in the listing, or until the source node (node 1) decides to modify the time slot assignment scheme. The virtual circuit is constructed and torn down dynamically in the network as part of the disclosed distributed hybrid allocation and reservation multiple access's (DHARMA's) slot reservation scheme.

FIG. 2 is a diagram 200 showing three graphs 210, 220, 230 depicting exemplary assignments of time slots for media data (e.g., audio and/or video data) and non-media data (e.g., internet protocol (IP) datagrams), in accordance with at least one embodiment of the present disclosure. In this figure, graph 210 shows an example time slot assignment scheme for a source node (e.g., node 1 in FIG. 1). Graph 220 shows an example time slot assignment scheme for a first relay node (e.g., node 3 in FIG. 1) in a path from a source node (e.g., node 1 in FIG. 1) to a destination node (e.g., node 7 in FIG. 1). And, graph 230 shows an example time slot assignment scheme for a second relay node (e.g., node 6 in FIG. 1) in a patch from a source node (e.g., node 1 in FIG. 1) to a destination node (e.g., node 7 in FIG. 1).

In this example, since more than one channel is being used, the time slot assignments for the source node and each relay node are staggered across different channels. For example, the time slots for the source node are over channel 1, the time slots for the first relay node are over channel 2, and the time slots for the second relay node are over channel 3. It should be noted that when more than one channel is available for use, the time slot assignments may (or may not) be staggered across at least one two of the channels.

The exemplary assignments of time slots for media data and non-media data for the source node, the first relay node, and the second relay node are as follows:

Relay 2: Ch 3: 5→8→11→14→<u>15</u>→<u>16</u>→<u>17</u>
Relay 1: Ch 2: 3→6→9→12→<u>18</u>→<u>19</u>→<u>20</u>
Source: Ch 1: 1→2→4→7→10→<u>21</u>→<u>22</u>→<u>23</u>

The underlined time slots indicate time slots that are assigned for non-media data, and the non-underlined time slots indicated time slots that are assigned for media data.

For the source node, the time slots are over channel 1, and time slots 1, 4, 7, and 10 are assigned for media data. Also for the source node, the time slots 2, 21, 22, and 23 are assigned for non-media data. Time slots 1, 4, 7, 10, and 2 are standard sized time slots. Time slots 21, 22, and 23 are concatenated together to form a single super time slot for a long burst transmission of non-media data. It should be noted that time slots assigned for non-media data may or may not be concatenated together to form a super time slot.

For the first relay node, the time slots are over channel 2, and time slots 3, 6, 9, and 12 are assigned for media data. Also for the first relay node, the time slots 18, 19, and 20 are assigned for non-media data. Time slots 3, 6, 9, and 12 are standard sized time slots for transmission of media data. Time slots 18, 19, and 20 are concatenated together to form a single super time slot for a long burst transmission of non-media data.

For the second relay node, the time slots are over channel 3, and time slots 5, 8, 11, and 14 are assigned for media data. Also for the second relay node, the time slots 15, 16, and 17 are assigned for non-media data. Time slots 5, 8, 11, and 14 are standard sized time slots for transmission of media data. Time slots 15, 16, and 17 are concatenated together to form a single super time slot for a long burst transmission of non-media data.

Figure 3:
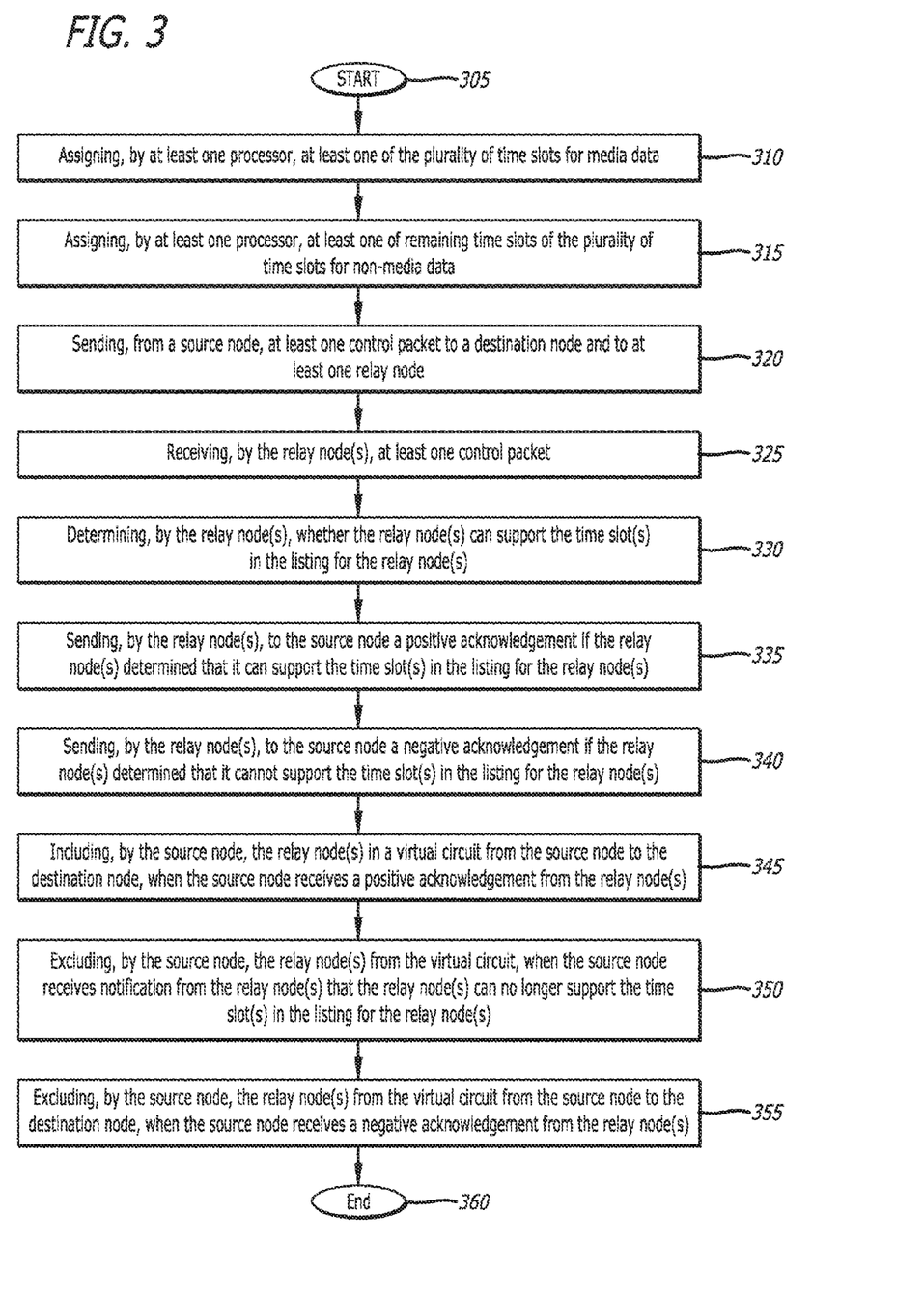
FIG. 3 depicts a flow chart showing the method for combining voice and data communications in a distributed hybrid allocation and reservation multiple access (MA) mobile wireless network, in accordance with at least one embodiment of the present disclosure.

FIG. 3 depicts a flow chart showing the method 300 for combining voice and data communications in a distributed hybrid allocation and reservation multiple access (MA) mobile wireless network, in accordance with at least one embodiment of the present disclosure. At the start 305 of the method 300 for communication utilizing a plurality of time slots over at least one channel, at least one processor assigns at least one of the plurality of time slots for media data (e.g., audio (e.g., voice) and/or video data) 310. In one or more embodiments, the plurality of time slots assigned for the media data is periodic. At least one processor assigns at least one of the remaining (i.e. not-assigned) time slots of the plurality of time slots for non-media data 315. In at least one embodiment, the assigning of at least one of the plurality of time slots for the media data has precedence over the assigning of at least one of the remaining time slots of the plurality of time slots for the non-media data. In some embodiments, at least one processor is associated with a source node.

The source node sends at least one control packet to a destination node and to at least one relay node 320. In one or more embodiments, the control packet(s) comprises a listing for the relay node(s) of the time slot(s) that are assigned for media data and/or non-media data to be supported by that relay node(s). The relay node(s) receives the control packet(s) 325.

The relay node(s) determines whether the relay node(s) can support the time slot(s) in the listing for that relay node(s) 330. The relay node(s) sends to the source node a positive acknowledgement, if the relay node(s) determines that it can support the time slot(s) in the listing for that relay node(s) 335. Also, the relay node(s) sends to the source node a negative acknowledgement, if the relay node(s) determines that it cannot support the time slot(s) in the listing for that relay node(s) 340.

The source node includes the relay node(s) in a virtual circuit from the source node to the destination node, when the source node receives a positive acknowledgement from the relay node(s) 345. The source node excludes the relay node(s) from the virtual circuit, when the source node later receives notification from the relay node(s) that the relay node(s) can no longer support the time slot(s) in the listing for the relay node(s) 350. The source node excludes the relay node(s) from the virtual circuit, when the source node receives a negative acknowledgement from the relay node(s) 355. Then, the method 300 ends 360.

Figure 4:
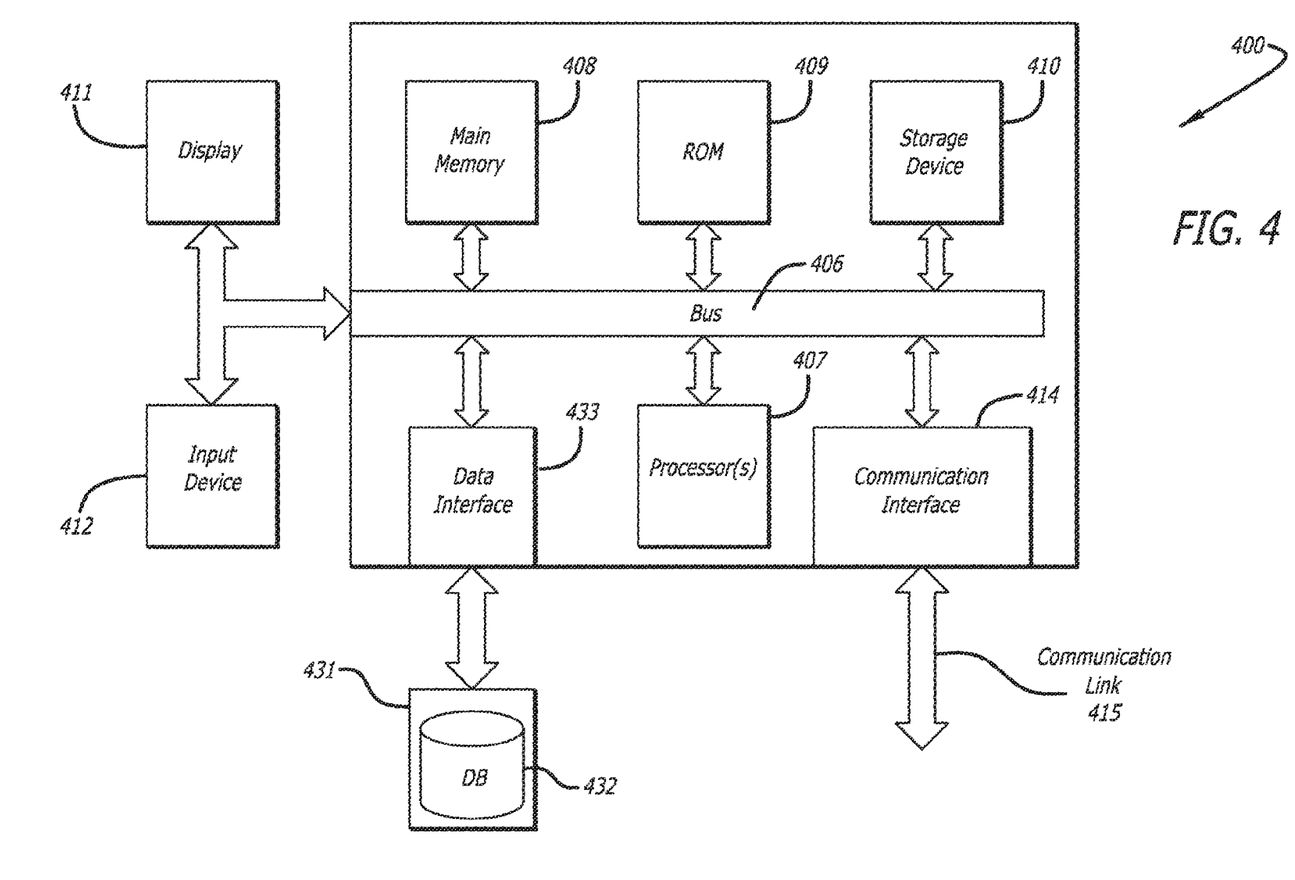
FIG. 4 illustrates a block diagram of an illustrative computing system suitable for implementing an embodiment of the present disclosure, in accordance with at least one embodiment of the present disclosure.

FIG. 4 illustrates a block diagram of an illustrative computing system 400 suitable for implementing an embodiment of the present disclosure. For example, a source node (e.g., node 1 in FIG. 1), a destination node (e.g., node 7 in FIG. 1), and/or at least one relay node (e.g., nodes 2, 3, 4, 5, and/or 6 in FIG. 1) of the disclosed system 100 (refer to FIG. 1) may include and/or employ at least a portion of the disclosed computer system 400. Computing system 400 includes a bus 406 or other communication mechanism for communicating information, which interconnects subsystems and devices, such as processor 407, system memory 408 (e.g., RAM), static storage device 409 (e.g., ROM), disk drive 410 (e.g., magnetic or optical), communication interface 414 (e.g., modem or Ethernet card), display 411 (e.g., CRT or LCD), input device 412 (e.g., keyboard), and cursor control (not shown).

According to one embodiment of the present disclosure, computer system 400 performs specific operations by processor 407 executing one or more sequences of one or more instructions contained in system memory 408. Such instructions may be read into system memory 408 from another computer readable/usable medium, such as static storage device 409 or disk drive 410. In alternative embodiments, hard-wired circuitry may be used in place of or in combination with software instructions to implement the present disclosure. Thus, embodiments of the present disclosure are not limited to any specific combination of hardware circuitry and/or software. In one embodiment, the term "logic" shall mean any combination of software or hardware that is used to implement all or part of the present disclosure.

The term "computer readable medium" or "computer usable medium" as used herein refers to any medium that participates in providing instructions to processor 407 for execution. Such a medium may take many forms, including but not limited to, non-volatile media, volatile media, and transmission media. Non-volatile media includes, for example, optical or magnetic disks, such as disk drive 410. Volatile media includes dynamic memory, such as system memory 408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the present disclosure, execution of the sequences of instructions to practice the present disclosure is performed by a single computer system 400. According to other embodiments of the present disclosure, two or more computer systems 400 coupled by communication link 415 (e.g., LAN, PTSN, or wireless network) may perform the sequence of instructions required to practice the present disclosure in coordination with one another.

Computer system 400 may transmit and receive messages, data, and instructions, including program, i.e., application code, through communication link 415 and communication interface 414. Received program code may be executed by processor 407 as it is received, and/or stored in disk drive 410, or other non-volatile storage for later execution. Computer system 400 may also interact with a database 432 within a database system 431 via a data interface 433 where the computer system 400 may store and retrieve information or data of the electronic design into and from the database system 431.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the invention. Additionally, parts of methods may be performed concurrently in a parallel process when possible, as well as performed sequentially. In addition, more parts or less part of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for communication utilizing a plurality of time slots over at least one channel, the method comprising:
    assigning, by at least one processor, at least one of the plurality of time slots for media data,
    wherein the at least one of the plurality of time slots assigned for the media data is periodic;
    assigning, by the at least one processor, at least one of remaining time slots of the plurality of time slots for non-media data,
    wherein the assigning of the at least one of the plurality of time slots for the media data has precedence over the assigning of the remaining time slots of the plurality of time slots for the non-media data; and
    sending, from a source node, at least one control packet to a destination node and to at least one relay node,
    wherein the at least one control packet comprises a listing, for each of the at least one relay node, of at least one of the time slots that are assigned for at least one of the media data and the non-media data to be supported by the at least one relay node.

2. The method of claim 1, wherein the media data comprises at least one of audio data and video data.

3. The method of claim 1, wherein the at least one processor is associated with the source node.

4. The method of claim 1, wherein when the plurality of time slots are over at least two channels, the assigning of the at least one of the plurality of time slots for the media data is staggered over at least two of the channels.

5. The method of claim 1, wherein at least two of the remaining time slots of the plurality of time slots that are assigned to non-media data are concatenated together.

6. The method of claim 1, wherein the at least one control packet is sent by at least one of a multicast, a broadcast, a link-state routing-based unicast, and a source routed path through the at least one relay node.

7. The method of claim 1, wherein the method further comprises:
    receiving, by the at least one relay node, the at least one control packet; and
    determining, by the at least one relay node, whether the at least one relay node can support the at least one of the time slots in the listing for the at least one relay node.

8. The method of claim 7, wherein the method further comprises:
    sending, by the at least one relay node, to the source node a positive acknowledgement if the at least one relay node determined that the at least one relay node can support the at least one of the time slots in the listing for the at least one relay node; and
    including, by the source node, the at least one relay node in a virtual circuit from the source node to the destination node, when the source node receives a positive acknowledgement from the at least one relay node.

9. The method of claim 8, wherein the method further comprises excluding, by the source node, the at least one relay node from the virtual circuit, when the source node receives a notification from the at least one relay node that the at least one relay node can no longer support the at least one of the time slots in the listing for the at least one relay node.

10. The method of claim 7, wherein the method further comprises:
    sending, by the at least one relay node, to the source node a negative acknowledgement if the at least one relay node determined that the at least one relay node cannot support the at least one of the time slots in the listing for the at least one relay node; and
    excluding, by the source node, the at least one relay node from a virtual circuit from the source node to the destination node, when the source node receives a negative acknowledgement from the at least one relay node.

11. A system for communication utilizing a plurality of time slots over at least one channel, the system comprising:
    at least one processor to assign at least one of the plurality of time slots for media data, and to assign at least one of remaining time slots of the plurality of time slots for non-media data,
    wherein the at least one of the plurality of time slots assigned for the media data is periodic,
    wherein the assigning of the at least one of the plurality of time slots for the media data has precedence over the assigning of the remaining time slots of the plurality of time slots for the non-media data; and
    a source node to send at least one control packet to a destination node and to at least one relay node,
    wherein the at least one control packet comprises a listing, for each of the at least one relay node, of at least one of the time slots that are assigned for at least one of the media data and the non-media data to be supported by the at least one relay node.

12. The system of claim 11, wherein the media data comprises at least one of audio data and video data.

13. The system of claim 11, wherein the at least one processor is associated with the source node.

14. The system of claim 11, wherein when the plurality of time slots are over at least two channels, the at least one processor assigns the at least one of the plurality of time slots for the media data such that the at least one of the plurality of time slots for the media data is staggered over at least two of the channels.

15. The system of claim 11, wherein at least two of the remaining time slots of the plurality of time slots that are assigned to non-media data are concatenated together.

16. The system of claim 11, wherein the source node sends the at least one control packet by at least one of a multicast, a broadcast, a link-state routing-based unicast, and a source routed path through the at least one relay node.

* * * * *